US006999964B2

(12) United States Patent
Graser et al.

(10) Patent No.: US 6,999,964 B2
(45) Date of Patent: Feb. 14, 2006

(54) SUPPORT FOR DOMAIN LEVEL BUSINESS OBJECT KEYS IN EJB

(75) Inventors: Tim Graser, Rochester, MN (US); Erik Edward Voldal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 09/850,647

(22) Filed: May 7, 2001

(65) Prior Publication Data

US 2002/0165867 A1 Nov. 7, 2002

(51) Int. Cl.
*G06F 17/30* (2006.01)

(52) U.S. Cl. ....................................... 707/100; 717/118

(58) Field of Classification Search .................... 707/1, 707/100, 3, 8, 10, 104.1; 345/619, 749, 763; 717/130, 131, 154, 118

See application file for complete search history.

(56) References Cited

U.S. PATENT DOCUMENTS

| | | | | |
|---|---|---|---|---|
| 6,418,448 | B1 * | 7/2002 | Sarkar | 707/104.1 |
| 6,591,272 | B1 * | 7/2003 | Williams | 707/102 |
| 6,597,366 | B1 * | 7/2003 | Bennett et al. | 345/619 |
| 2002/0049788 | A1 * | 4/2002 | Lipkin et al. | 707/513 |
| 2003/0212987 | A1 * | 11/2003 | Demuth et al. | 717/130 |

FOREIGN PATENT DOCUMENTS

WO WO 01/27814 A1 * 4/2001

OTHER PUBLICATIONS

Pearson Technology Group, Advanced Java 2 Development for Enterprise Applications 2/e, Clifford j. Berg, Published Dec. 1999, Prentice Hall, chapter 8, p. 602-658. (Retrieved on Oct. 15, 2003, http://www.pearsonptg.com/samplechapter/0130848751).□□.*

Steve Demuth, Client-side Java for EJB's, Jul. 2000, pp. 1-4.*

OMG Business Object and Enterprise Java Beans, Dec. 17, 1999, pp. 1-5.*

* cited by examiner

*Primary Examiner*—Uyen Le
*Assistant Examiner*—Hanh Thai
(74) *Attorney, Agent, or Firm*—Dillon & Yudell, LLP

(57) ABSTRACT

A method, system and program product for providing domain level business object keys in Enterprise JavaBeans (EJB) applications. An instance of an EntityBean object is provided with both a primary key and a domain key class. The primary key class is associated with a home selected for the EntityBean object, and the domain key class is associated with a particular business application within which the EntityBean object is being utilized. The EntityBean and associated home is utilized across different business applications, while ensuring uniqueness across the different applications. Also, a common interface for the primary key is introduced that has methods, which (1) provide an initialized instance of associated domain key classes from a concrete primary key subclass, wherein a concrete primary key subclass knows its associated domain key and is able to initialize the domain key from a subset of attributes of the primary key, and (2) creates an initialized instance of a primary key subclass from a given domain key and a context object.

17 Claims, 4 Drawing Sheets

SUPPORT FOR DOMAIN LEVEL BUSINESS OBJECT KEYS IN EJB

BACKGROUND OF THE INVENTION

1. Technical Field

The present invention generally relates to distributed data processing systems and in particular to server programming in distributed data processing systems with Enterprise JavaBeans™ (EJB) applications. Still more particularly, the present invention relates to a method, system, and program product that provides domain level business object keys in EJB applications.

2. Description of the Related Art

Java™ (Java) is a computing application developed for distributed computing with low (or little) administration and platform independence. The Java™ platform for enterprise-capable Java™ computing utilizes Enterprise JavaBeans™ (EJBean or EJB) (trademark of Sun Microsystems) technology that provides for the development and deployment of reusable server components. EJBean server components are individual specialized applications that run in an application server.

EJBeans are designed to support high scalability utilizing a multi-tier distributed application architecture (i.e., architecture that has multiple application components), and the multi-tier orientation provides many advantages over traditional client/server architectures. EJBean components contain no system level programming, include only business related logic, and are fully portable across any EJBean compliant server and any Operating System (OS).

A server component is a reusable software application that performs specific functions and is accessible to other applications through the server component's interface. Thus, a server component can be developed for one application and reused in another application. Server components are basic building blocks that have specific, published functions that may be combined with other components and applications into a configuration that performs a task designed by a developer.

Traditionally, a Java Virtual Machine (JVM) allows a Java application to run on any operating system, but server side components require proprietary programming interfaces based on vendor software and hardware. EJBean server components, however, are portable and virtually vendor-independent on all Java EJBean compliant application servers. With their server component portability, increased scalability, reliability, and re-usability, EJBean components can be moved from one execution environment to another without requiring any re-coding.

IBM's Websphere Application Server is an EJB server environment that provides support for the EJB specification. Websphere Application Server provides the quality of service prescribed by the EJB specification and allows developers to build enterprise application business objects using the EJB programming model. In Websphere Application Server, a component consists of a distributed set of objects that client applications access as a single entity. To a client application, a component appears to be a single class, with methods and attributes and relationships like any other class. Behind this single interface, however, each component consists of multiple objects on both the client and the server. This separation provides flexibility and control in the way data is stored and accessed and in the way that business processes are distributed. Thus, the objects can exist on any number of different servers and databases, but to the client they present a single interface, with a single set of attributes.

Typically, a component consists of several primary types of objects. These primary object types are:

(1) business objects, which represents a business function; and (2) application objects—business objects which are directing workflow and implementing some client initiated task. Specifically, in Websphere Application Server, an application object functions as part of an application component, which implements business logic and usage of other components similar to the way some application programs do today.

Business objects contain attributes that define the state of the object and methods that define the behavior of the object. A business object may also have relationships with other business objects and may cooperate with other business objects to perform a specific task. Business objects are independent of any individual application and may be utilized in any combination to perform a desired task. Typical examples of business objects are Customer, Invoice, and Account.

In Websphere Application Server, a business object functions as part of a component, which is a collection of related objects that work together to represent the logic and data relationships of the business function. A business object's interface and its implementation are defined in Java.

In Java, each object or enterprise Bean class exists as an EntityBean, by which a container may notify the enterprise Bean instances of the instance's life cycle events. The EJB architecture provides that an EntityBean must have a unique primary key. The primary key serves as a unique identifier and is utilized to locate the object. The EJB architecture also provides that the uniqueness of the primary key is scoped to the home that was chosen for the EntityBean class during deployment. Scoping of primary keys provides a straightforward mapping of the EntityBean's persistent state into an underlying database table. However, this straightforward mapping may not be sufficient in a robust, object-oriented business application.

In other words, keys provided in the business domain (i.e., "domain keys") are often only unique within the scope of a processing context provided by another business object. For example, an application for a multi-company enterprise, such as IBM, may choose to scope Customer objects to Company objects, i.e., the identifiers (domain keys) of the Customer objects would only be unique within the scope of a Company object. The current EJB approach of scoping primary keys to homes, forces the use of different Customer homes for different Companies and exhibits several limitations including: (1) The approach makes it difficult to place customer instances from different companies into a single shared table because the primary key does not provide sufficient uniqueness; (2) The approach presents the application with the difficulty of finding the correct Customer home to use for a given Company object; and (3) If a new Company object is created, another deployment of the Customer class must be performed, which is unacceptable for an end user.

Therefore, the present invention recognizes that it would be desirable to provide a system, method, and program product that allows a business application to utilize domain level keys scoped to a Company to locate Customer objects while at the same time supporting a primary key for the Customer class that ensures uniqueness across Companies to enable reusable business components. A system, method and program product that is able to isolate business application code from the exact class of either the domain key or primary key of an EntityBean so that the deployer of the EntityBean class may determine the actual key classes used for the EntityBean would be a welcomed improvement. These and other benefits are provided by the present invention.

SUMMARY OF THE INVENTION

Disclosed is a method, system and program product for providing domain level business object keys in Enterprise JavaBeans (EJB) applications. An instance of an EntityBean object is provided with both a primary key and a domain key class. The primary key class is associated with a home selected for the EntityBean object, and the domain key class is associated with a particular business application within which the EntityBean object is being utilized. The EntityBean and associated home is thus able to be utilized across different business applications while ensuring uniqueness across said different applications.

The primary key is generated with data and attributes of the domain key plus additional partitioning information that provides uniqueness based on the identity of a context object. The primary key class is mapped to a persistent state of the EntityBean into an underlying database table and an interface name for a particular EntityBean class during configuration. A method is provided for each EntityBean interface that utilizes the mapping with EJB configuration information to (1) get a class of said primary key, (2) create an instance of said primary key class, and (3) initialize said instance of said class.

In the preferred embodiment, a common interface for said primary key is introduced that has methods, which (1) provides an initialized instance of associated domain key classes from a concrete primary key subclass, wherein a concrete primary key subclass knows its associated domain key and is able to initialize the domain key from a subset of attributes of the primary key, and (2) creates an initialized instance of a primary key subclass from a given domain key and a context object.

Thus, in one exemplary embodiment, the business application is allowed to utilize domain level keys scoped to a Company to locate customer objects while, at the same time, supporting a primary key for the Customer class that ensures uniqueness across Companies. Further, business application code (i.e., code not actually creating keys from user data) is isolated from the exact class of either the domain key or primary key of an EntityBean to allow the deployer of the EntityBean class to determine the actual key classes used for the EntityBean.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
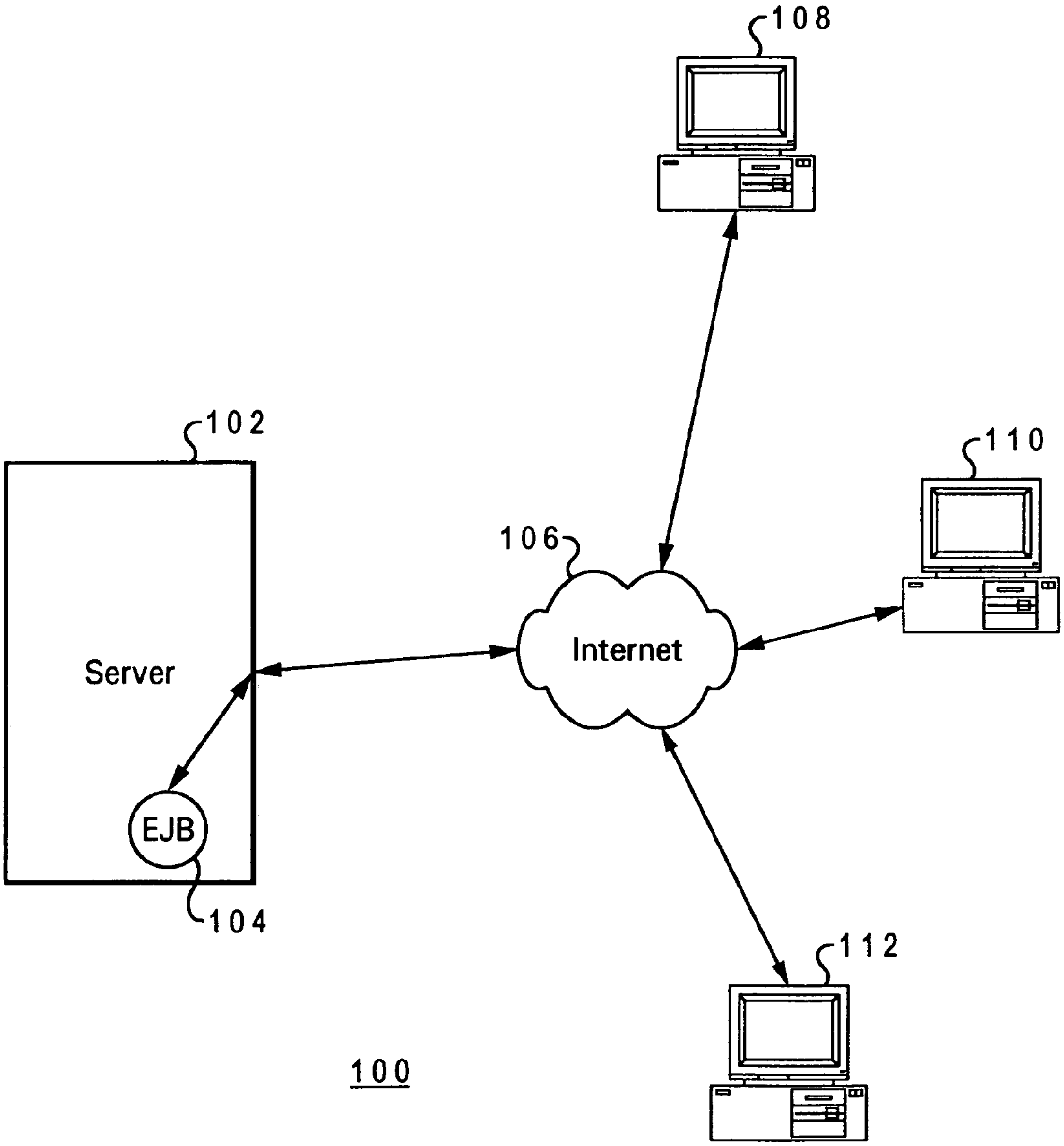
FIG. 1A depicts a distributed computing system in accordance with a preferred embodiment of the present invention.

With reference now to the figures, and in particular with reference to FIG. 1, a distributed computing system in accordance with a preferred embodiment of the present invention, is depicted. System 100 includes server 102, Enterprise Java Bean (EJBean) 104, Network 106 and Clients 108 through 112. On server 102, multiple EJBean 104 components may exist at any one time, providing various business related functions. Server 102 is Enterprise Java Bean compliant and supplies a standard set of services to support EJBean 104 components. Additionally, server 102 provides a container for the EJBean 104 component that implements control and management for classes of the EJBean 104. Since EJBean 104 components do not require a specific container system, virtually any application server can be adapted to support EJBean 104 components by adding support for the service defined in the EJB specification.

In the present invention, Network 106 provides the connection between systems 108–112, which may represent a Local Area Networks (LAN), Wide Area Network (WAN), a group of standalone computers, or any data processing system that may connect with server 102 via Network 106. Multiple systems may connect at the same time with EJBean 104 with home and remote interfaces utilizing browser clients of Network 106. Each Enterprise Java Bean 104 is stored in a logical container (see FIG. 1B) and any number of EJBean 104 classes can be present in a single container. A container may not necessarily be present in a single server location and the EJB container could be replicated and distributed across many systems.

Figure 1B:
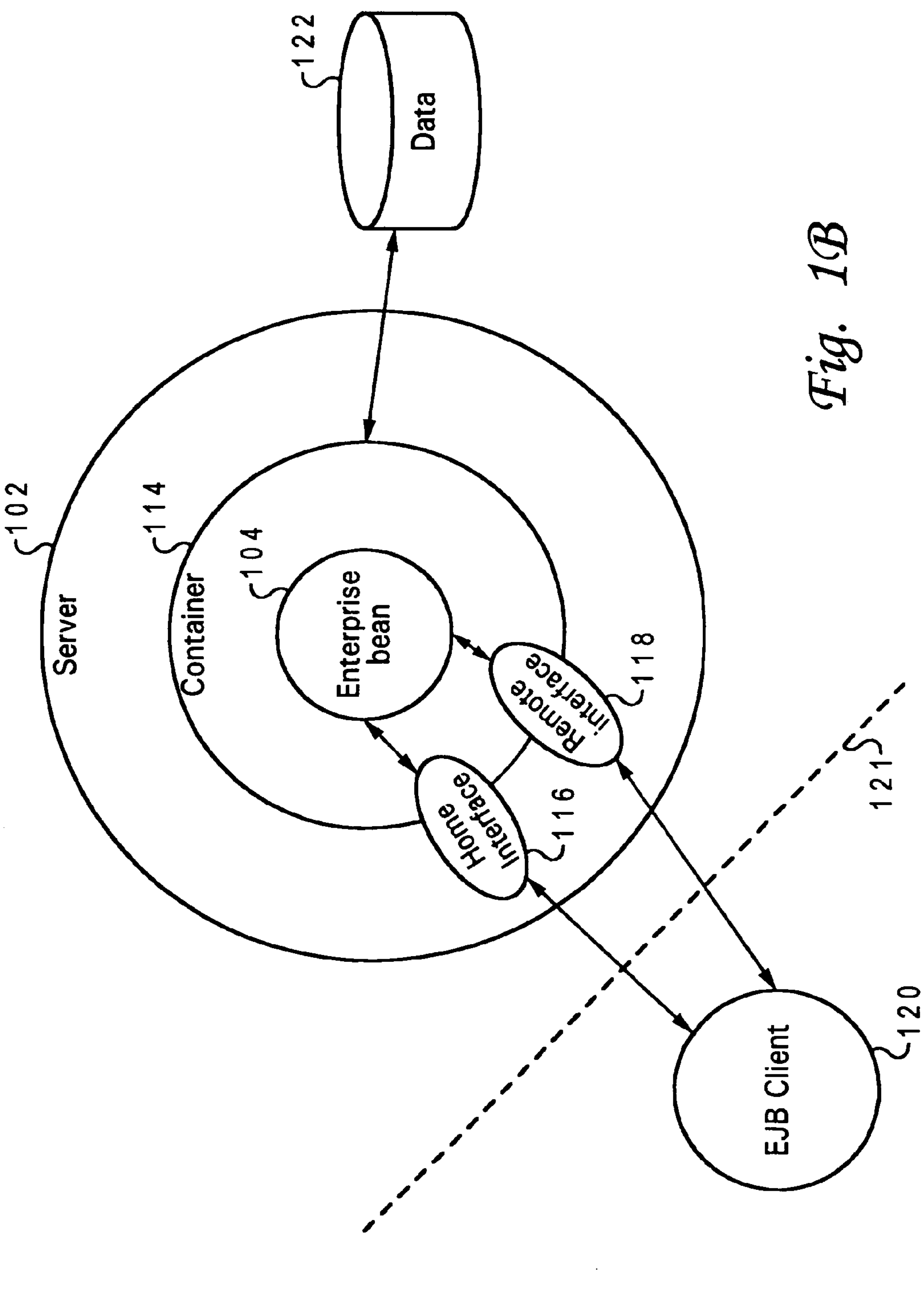
FIG. 1B is a high-level block diagram of the operation of an Enterprise Java Bean (EJB) in accordance with the present invention.

Referring to FIG. 1B, a high-level block diagram of the operation of an Enterprise Java bean in accordance with the present invention, is illustrated. Client 120 is a Java compliant program originating on a data processing system that is typically remote from the server. Container 114 supports the interface between client 120 and EJBean 104. When EJBean 104 is deployed, container 114 supports home interface 116 and remote interface 118 which are provided by the bean developer. Remote interface 118 provides access, by client 120, to business methods within EJBean 104. Home interface 116 is utilized to create, find and remove EJBean 104 instances. Essentially, container 114 acts as a EJBean manager and provides rules concerning transactions, state, security, etc., on all operations. Additionally, container 114 provides an interface with data sources 122, external to the container, that EJBean 104 utilizes during transactions.

Figure 2:
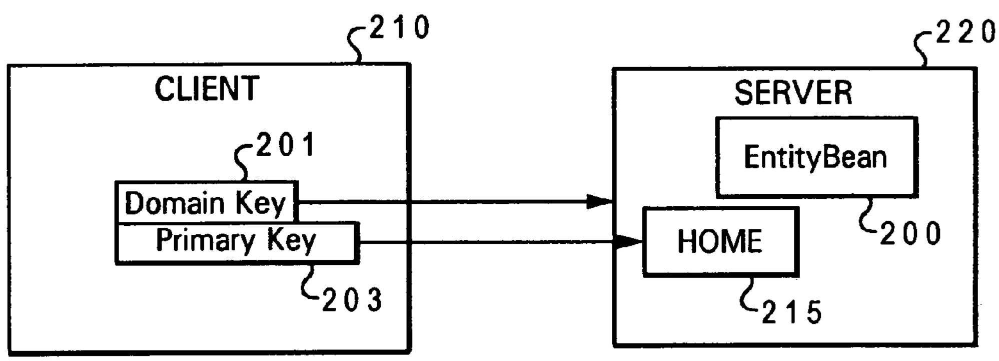
FIG. 2 is a block diagram of components of server-side commands/calls in accordance with the present invention.

In accordance with the preferred embodiment of the present invention, the business EntityBean object is designed with separate domain key and primary key classes. The primary key class is tightly coupled with the domain key class, i.e., the primary key class knows the specifics of the domain key class. In the preferred embodiment, the difference in the data contained in a domain key and a primary key is additional partitioning information in the primary key that provides uniqueness based on the identity of the context object. For example, as is illustrated in FIG. 2, in a Customer—Company (i.e., client 21—server 220) example, an EntityBean 200 is illustrated with both a domain key 201 and primary key 203. The domain key 201 for the EntityBean 200 contains the customer identifier (ID) while the primary key 203 for EntityBean 200 contains the customer ID as well as an identifier of the company object, such as a reference or a primary key of the context Company object. Also, as illustrated, primary key 203 for EntityBean 200 is mapped to Home 215 within the Company object.

Further, it is possible for business application code to efficiently find an EntityBean instance from a domain key and a context object without being aware of the exact key classes involved. Additionally, the domain key may be retrieved from an instance of the EntityBean without being aware of the exact key classes involved.

Figure 3:
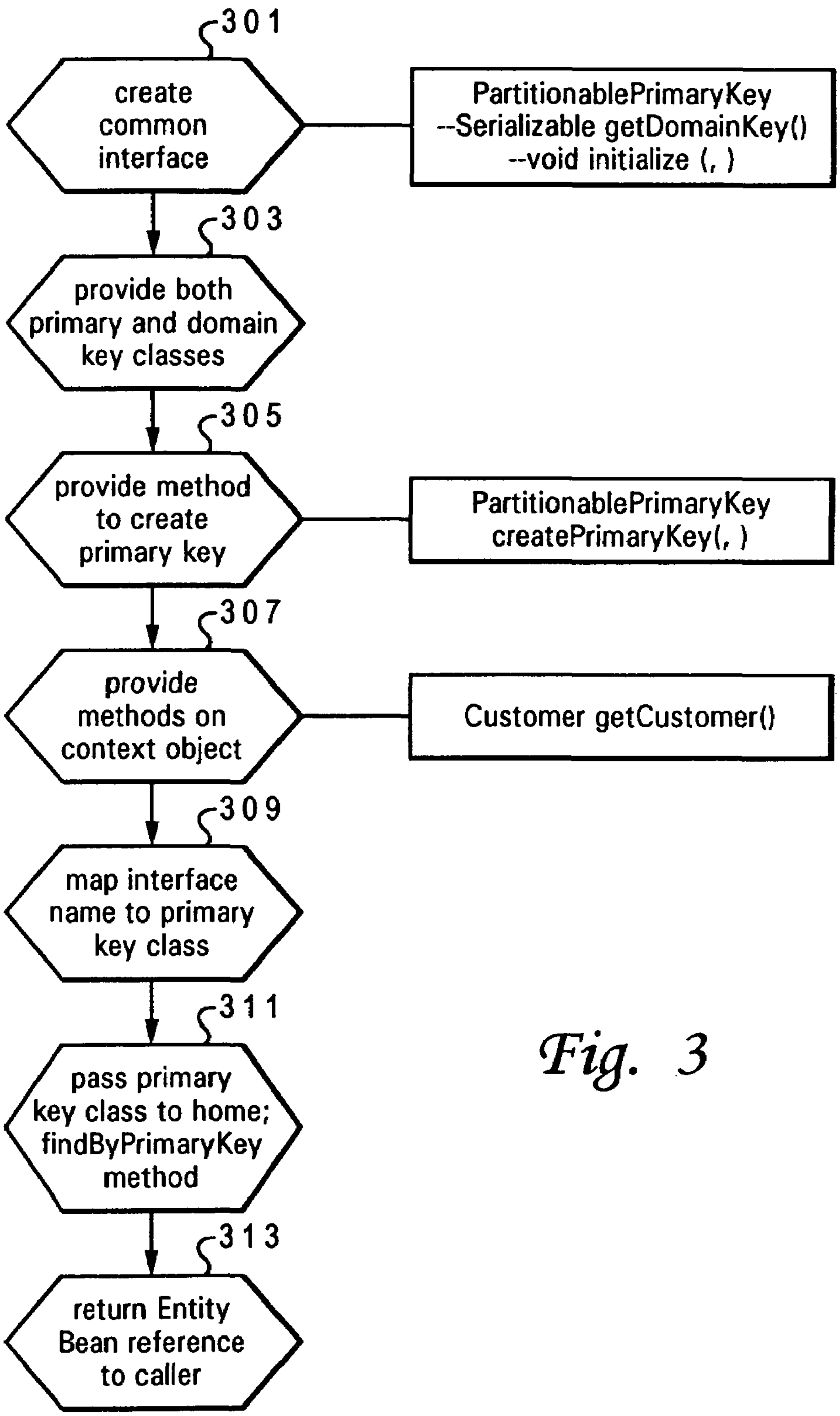
FIG. 3 is a flow diagram of the setup process of the various features of the present invention.

FIG. 3 provides a flow diagram of the processes involved in creating and utilizing the domain key and primary key for an EntityBean instance according to one embodiment of the invention. At various stages of the process, the methods utilized are illustrated to the right. First, a common interface for primary keys is introduced called PartitionablePrimaryKey as shown at block 301. This common interface introduces two methods:

Serializable getDomainKey( ); and void initialize (Serializable domainKey, EJBObject contextObject).

The contract of the getDomainKey method requires concrete primary key subclasses to produce an initialized instance of their associated domain key class. Implementations of this method are possible based on the fact that the concrete primary key knows its associated domain key class and can initialize the associated domain key class from the primary key's attributes.

The contract of the initialize method requires concrete primary key implementations to initialize themselves from a given domain key and context object. This is possible because, in the preferred embodiment, the domain key's attributes plus the context object identity make up the primary key's attributes.

Returning now to FIG. 3, following the introduction of the PartitionablePrimaryKey, for each EntityBean wishing to make use of this feature in the product, two key classes are provided or designated as shown in block 303. These two key classes are: (1) a primary key class that implements the PartitionablePrimaryKey interface; and (2) an associated domain key class. In the preferred embodiment, to avoid exposing a dependency on a particular concrete primary key class, the findByPrimary method in EJBean's home interface is defined to take type object.

A method is provided, as illustrated at step 305, to create the primary key for each EntityBean interface (e.g., Customer) of the form:

PartitionablePrimaryKey createPrimaryKey(Serializable domainKey, Entity contextObject)

The preferred embodiment is to provide this as a static method on a separate class for each EntityBean. The method is implemented to utilize the mapping described below at step 309 to use the EJB configuration information to get the class of the primary key, create an instance of that class, and then initialize the class utilizing the initialize method from the PartitionablePrimaryKey interface. According to the preferred embodiment, none of the above steps requires an awareness (or knowledge) of the actual class of either the domain key or the primary key.

Next, as illustrated at step 307, methods are provided on the context object (e.g., Company) to access instances of the target EntityBean class (e.g., Customer) using only a domain key. These methods include, for example:

Customer get customer(Serializable domainKey).

The methods are implemented to first call the static createPrimaryKey method described at step 305, thus passing the given domain key and a reference to the context object itself. The static method will return an initialized instance of the primary key class. A mapping of the interface name for a particular EntityBean class to the deployed primary key class for that EntityBean is established at configuration time as shown at step 309. Following, initialized instance of the primary key class is then passed as a parameter to the findByPrimaryKey method on the home of the target EntityBean class as shown at step 311. The returned EntityBean reference is then returned to the caller as depicted at step 313. As previously provided, the implementation of these methods do not require an awareness of the actual class of either the domain key or the primary key.

During operation, the application code is able to retrieve a domain key from an EntityBean by first retrieving its primary key through standard EJB APIs, (e.g., the EJBObject getPrimaryKey method) casting the primary key to a PartitionablePrimaryKey, and then calling the getDomainKey method. Again, these steps do not require an awareness of the concrete primary or domain key classes.

The invention thus provides several enhanced EJB features including: (1) the concept of a domain key supported in a way that allows runtime introduction of additional context objects; (2) writing application code to work with domain keys that are scoped by a context object in a straightforward fashion; and (3) decoupling business object code from dependencies on the deployed domain or primary key concrete classes.

Based on the foregoing implementation, the business application code is able to efficiently find an EntityBean instance from a domain key and a context object without being aware of the exact key classes involved. Also, the domain key may be retrieved from an instance of the EntityBean without being aware of the exact key classes involved.

As stated above, the invention allows true runtime introduction of new context object instances without additional deployments of the target EntityBean. The invention provides reusable business components in Enterprise JavaBeans (EJB) applications. Further, the business application is allowed to utilize domain level keys scoped to a Company to locate Customer objects while, at the same time, supporting a primary key for the Customer class that ensures uniqueness across Companies. Business application code (i.e., code not actually creating keys from user data) is isolated from the exact class of either the domain key or primary key of an EntityBean to allow the deployer of the EntityBean class to determine the actual key classes used for the EntityBean.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention. Thus, while the invention is described with reference to a company and associated customer classes, it is understood that the specific references to these elements are for illustrative purposes only and not meant to be limiting on the invention.

What is claimed is:

1. A method for providing domain level business components in an Enterprise JavaBeans (EJB) application comprising:

providing an instance of an EntityBean object with both a primary key class and a domain key class, wherein said primary key class comprises data and attributes of said domain key class and additional partitioning information that provides uniqueness based on an identity of a context object;

associating said primary key class with a home selected for said EntityBean object, said associating of said primary key class comprising:

mapping a persistent state of the EntityBean into an underlying EJB database table; and mapping an interface name for a particular EntityBean to a deployed primary key class during configuration;

associating said domain key class to particular business applications within which said EntityBean object is being utilized;

wherein said primary key class and associated home may be utilized across different business applications, each utilizing the domain key class, while ensuring uniqueness across said different applications of said primary key via said domain key class and attributes of a context object assigned to each particular business application; and isolating business application code from an exact class of both the primary key and the domain key of said EntityBean object to enable a deployer of the EntityBean object to determine the actual key classes utilized for the EntityBean object, wherein reusability of said EntityBean object is enabled.

2. The method of claim 1, further comprising providing a method for each EntityBean interface that utilizes said mapping with EJB configuration information to (1) get a class of said primary key class, (2) create an instance of said primary key class, and (3) initialize said instance of said class.

3. The method of claim 1, further comprising enabling methods within a business application code to locate and access an instance of an EntityBean can utilizing a domain key and context object without being aware of an exact key class.

4. The method of claim 3, further comprising enabling a business application code to retrieve said domain key from an instance of said EntityBean utilizing the primary key class without being aware of said exact primary key class.

5. The method of claim 4, further comprising introducing a common interface for said primary key class, wherein said interface comprises methods that provide (1) an initialized instance of associated domain key classes from a concrete primary key class, wherein a concrete primary key class knows its associated domain key class and is able to initialize the domain key from a subset of attributes of said primary key class, and (2) an initialized instance of a primary key class from a given domain key class and a context object.

6. The method of claim 5, further comprising retrieving said domain key class from said EntityBean by first retrieving said primary key class through EJB APIs, and forwarding said primary key class to a common interface, which interface calls a method that returns said domain key class.

7. The method of claim 1, wherein said EJB application comprises a company object having a customer object, and said providing step includes:

generating said domain key with a customer identification (ID); and generating said primary key with both said customer ID and an ID of said company object, wherein said domain level keys to said company object may be scoped to locate said customer object.

8. The method of claim 1, wherein:

said domain key class contains a customer identifier (ID); and said primary key class contains said customer ID as well as an ID of a company object, including a reference or primary key class of a context company object.

9. A computer program product for providing domain level business components in an Enterprise JavaBeans (EJB) application, said program product comprising:

a computer readable medium; and program code on said computer readable medium for;

providing an instance of an EntityBean with both a primary key class and a domain key class, wherein said primary key is generated with data and attributes of said domain key class plus additional partitioning information that provides uniqueness based on an identity of a context object;

associating said primary key class with a home selected for said EntityBean;

associating said domain key class to a particular business application within which said EntityBean is being utilized, wherein said primary key class and associated home may be utilized across different business applications each sharing a similar domain key class;

isolating business application code from an exact class of either said domain key class or said primary key class of said EntityBean, wherein a deployer of said EntityBean may determine an actual key class utilized for said EntityBean and wherein reusability of said EntityBean is enabled; and enabling methods within a business application code to locate and access an instance of an EntityBean utilizing a domain key and context object without being aware of an exact key class.

10. The computer program product of claim 9, wherein said program code for associating of said primary key class includes program code for:

mapping a persistent state of the EntityBean into an underlying EJB database table; and mapping an interface name for a particular EntityBean to a deployed primary key class during configuration.

11. The computer program product of claim 10, further comprising program code for providing a method for each EntityBean interface that utilizes said mapping with EJB configuration information to (1) get a class of said primary key, (2) create an instance of said primary key class, and (3) initialize said instance of said primary key class.

12. The computer program product of claim 9, further comprising program code for enabling a business application code to retrieve said domain key class from an instance of said EntityBean without being aware of said exact primary key class.

13. The computer program product of claim 12, further comprising program code for introducing a common interface for said primary key class, wherein said interface has methods that provide (1) an initialized instance of associated domain key classes from a concrete primary key class, wherein a concrete primary key class knows its associated domain key class and is able to initialize the domain key class from a subset of attributes of said primary key class, and (2) an initialized instance of a primary key class from a given domain key class and a context object.

14. The computer program product of claim 13, further comprising program code retrieving said domain key class from said EntityBean by first retrieving said primary key class through EJB APIs, and forwarding said primary key class to a common interface, which calls a method that returns said domain key class.

15. The computer program product of claim 9, wherein said EJB application comprises a company object having a customer object, and said providing program code includes program code for:

generating said domain key with a customer identification (ID); and generating said primary key with said customer ID and an ID of said company object, wherein said domain level keys to said company object may be scoped to locate said customer object.

16. A computer-based system comprising:

at least one processor;

a computer readable medium associated with said processor; and program code on said computer readable medium that is executed by said processor and which provides;

a business application having an EntityBean instance that comprises a primary key class and a domain key class, wherein said primary key class is generated with data and attributes of said domain key class and additional partitioning information that provides uniqueness based on an identity of a context object;

means for locating said EntityBean instance from said domain key class and a context object without being aware of an exact primary key class of said EntityBean instance, said means including means for:

associating said primary key class with a home selected for said EntityBean object; and associating said domain key class to a particular business application within which said EntityBean object is being utilized, wherein said primary key class and associated home may be utilized across different business applications while ensuring uniqueness across said different applications via said domain key class;

means for providing a common interface for said primary key class, wherein said interface has methods that provide (1) an initialized instance of associated domain key classes from a concrete primary key subclass, wherein a concrete primary key class knows its associated domain key class and is able to initialize the domain key class from a subset of attributes of said primary key class, and (2) an initialized instance of a primary key class from a given domain key class and a context object; and means for enabling reusability of said EntityBean across multiple Enterprise JavaBean (EJB) applications, while ensuring uniqueness across specific applications;

means for isolating business application code from an exact class of either said domain key class or said primary key class of said EntityBean, wherein a deployer of said EntityBean class may determine an actual key class utilized for said EntityBean and wherein reusability of said EntityBean is enabled; and means for enabling methods within a business application code to locate and access an instance of an EntityBean utilizing a domain key class and context object without being aware of an exact key class.

17. The computer program product of claim 9, wherein:

said domain key class contains a customer identifier (ID); and said primary key class contains said customer ID as well as an ID of a company object, including a reference or primary key class of a context company object.

* * * * *